Figure 1:
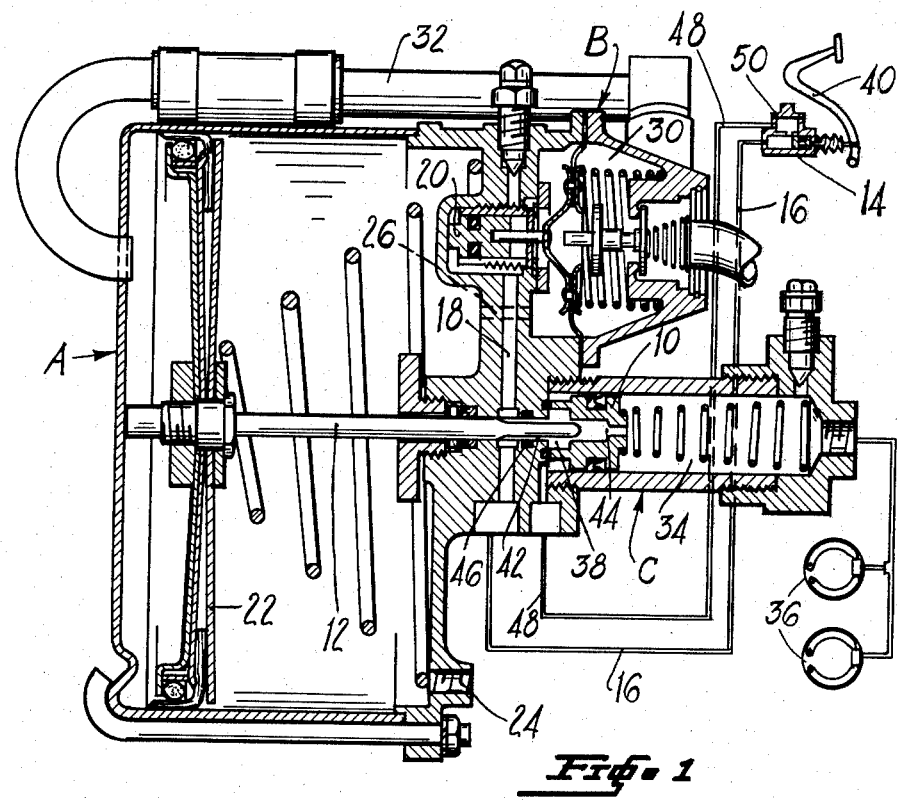

March 3, 1959 — S. E. MARTIN — 2,875,583
POWER DRIVEN FLUID PRESSURIZING DEVICE
Filed May 21, 1957

INVENTOR.
STEVE E. MARTIN
BY William P. Hickey
ATTORNEY

United States Patent Office 2,875,583
Patented Mar. 3, 1959

2,875,583
POWER DRIVEN FLUID PRESSURIZING DEVICE

Steve E. Martin, South Bend, Ind., assignor to Bendix Aviation Corporation, South Bend, Ind., a corporation of Delaware Application May 21, 1957, Serial No. 660,648

5 Claims. (Cl. 60—54.6)

The present invention relates to fluid pressure servo-motors of a type in which a fluid pressure control signal is normally intensified by the servo-motor unit, and in which the input signal will be passed directly to the unit's discharge upon power failure of the device; and more particularly to an improved device of the above described type, which during power operation of the servo-motor eliminates "follow-up" from the control signal, and communicates the back side of the unit's fluid displacement member to a separate reservoir of fluid.

An object of the present invention is the provision of a new and improved fluid pressure servo-motor of the above described type adaptable for use with automotive hydraulic braking systems and the like; and which unit is simple and rugged in design, efficient and reliable in its operation, and inexpensive to manufacture.

Another object of the invention is the provision of a new and improved fluid pressure servo-motor of the above described type having a "follow-up" chamber on the back side of its fluid displacement member and through which the fluid control signal will be passed to the discharge of the unit during power failure of the device; and in which the control signal will be valved off from the "follow-up" chamber and the follow-up chamber will be communicated with a free body of liquid during normal power operation of the device.

A further object of the invention is the provision of a new and improved fluid pressure servo-motor of the above described type having a force transmitting member which when retracted causes: suitable valve means to pass the fluid pressure input signal of the device to the unit's discharge, and which when actuated valves off the input signal from the unit's "follow-up" chamber, while at the same time opening communication between the "follow-up" chamber and an external source of compensating fluid.

A still further object of the invention is the provision of a new and improved hydraulic fluid pressure servo-motor of the above described type whose discharge system is compensated through its fluid displacement member and "follow-up" chamber to the unit's hydraulic input signal system; and in which the unit's push rod or force transmitting member valves off the input signal system from the "follow-up" chamber, closes communication across its fluid displacement member, and thereafter opens communication of the follow-up chamber with a separate reservoir of fluid (preferably in the above order) during a power application of the unit.

Figure 2:
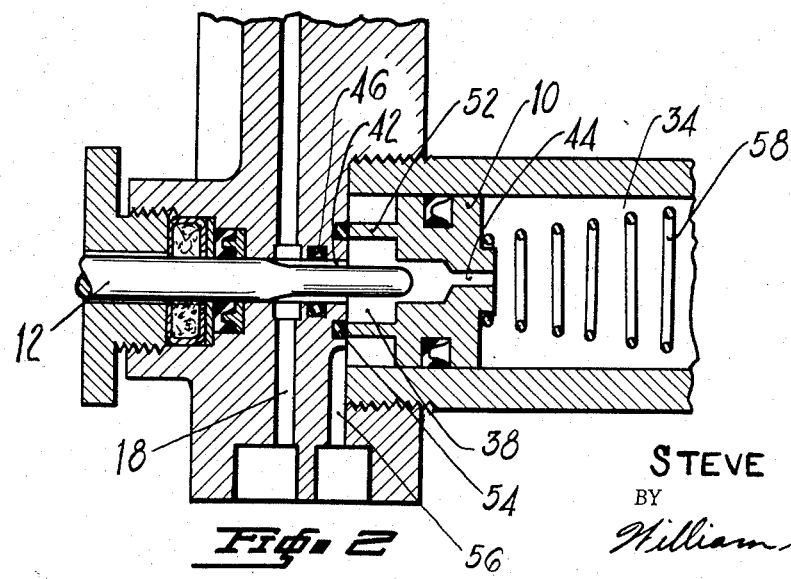

Further objects and advantages of the present invention will become apparent to those skilled in the art to which the invention relates from the following description of the preferred embodiment described with reference to the accompanying drawing forming a part of this specification, and in which:

Figure 1 is a cross-sectional view of a hydraulic fluid pressure servo-motor embodying principles of the present invention and is schematically shown as being used in an automotive hydraulic braking system; and Figure 2 is a fragmentary cross-sectional view of a portion of the device shown in Figure 1.

The fluid pressure servo-motor shown in Figure 1 generally comprises: a fluid pressure motor A, a control valve B therefore, and a fluid pressurizing device C whose movable wall or fluid displacement member 10 may be actuated by means of a push rod or force transmitting member 12 that is driven by the fluid pressure motor A. The unit is adapted to be controlled by means of a hydraulic input signal, which in the system shown in Figure 1 is derived from a hydraulic master cylinder 14 of the type employed in automotive hydraulic braking systems. Fluid pressure from the master cylinder 14 is communicated by a conduit 16 to a passageway 18 in the servo-motor leading to a hydraulically actuated piston 20 adapted to control the operation of the control valve B. The control valve B is identical in construction and operation with that shown in the Ringer Patent 2,719,405; and for a complete understanding of its construction and operation reference may be had to that patent. Suffice it to say that the fluid pressure motor A shown in the drawing is a vacuum submerged unit in which vacuum is normally supplied to the opposite sides of the power piston 22; and in which atmospheric pressure is bled to the back side of the power piston 22 by the control valve B as the pressure intensity of the hydraulic input signal from the master cylinder 14 increases. Vacuum is communicated with the near side of the power piston 22 by means of the vacuum connection 24, and thence to one chamber of the control valve B through passageway 26 to the vacuum chamber 28 of the valve. Vacuum from the chamber 28 is conducted through the control chamber 30 and interconnecting control line 32 to the back side of the power piston 22 during the normal or non-actuating condition of the valve.

The servo-motor shown in the drawing is of the type in which the hydraulic input signal from the master cylinder 14 communicates directly with the output or pressure developing chamber 34 of the fluid pressurizing device C to operate the brake applying wheel cylinders 36 of the vehicle when the movable wall 10 is in its normal retracted position. By means of such an arrangement, the brake applying wheel cylinders 36 can be actuated during power failure of the device without moving the movable wall 10; and such an arrangement also permits the replacing of fluid lost through leakage from the discharge of the unit by means of fluid obtained from the input signal system of the servo-motor. This is accomplished, in the device shown in the drawing, by means of a branch passageway 42 which communicates the passageway 18 with the "follow-up" chamber 38, through which a reduced diameter section of the push rod 12 extends when the power piston of the fluid pressure motor A is in its retracted position. Communication between the "follow-up" chamber 38 and the output chamber 34 is provided in the retracted position of the power piston 22 by means of an opening 44 through the movable wall 10, which opening 44 is adapted to be closed by the end of the push rod 12 when the movable wall 22 is caused to be actuated by the control valve B.

According to principles of the present invention, means are provided for valving off the hydraulic input signal produced by the master cylinder 14 from the "follow-up" chamber 38 of the fluid pressurizing device C when the fluid pressure motor A is actuated; such that very little movement of the foot pedal lever 40 is required during power operation of the vehicle brakes. This is accomplished in the embodiment shown in the drawing by a suitable seal 46 provided in the side walls of the branch passageway 42, for engagement with the major diameter portion of the push rod 12 during power actuation of the unit to close communication of the master cylinder 14 with the "follow-up" chamber 38. In the preferred form of the improved servo-motor, the clearance between the end of the push rod 12 and the opening 44 in the piston 10 will be such that the end of the push rod 12 will abut the movable wall 10 and close off the passageway 44 immediately after the push rod 12 has effected a seal with respect to the seal 46.

It is desired, in the preferred embodiment shown in the drawing, to connect the follow-up chamber 38 with a reservoir of hydraulic fluid which can flow into the follow-up chamber 38 as the movable wall 10 is driven into the output chamber 34, and thereby prevent a vacuum from developing in the follow-up chamber 38 during actuation of the fluid pressurizing device C. This is accomplished in the device shown in the drawing by means of a conduit 48 connecting the reservoir 50 of the master cylinder 14 with the area immediately behind the movable wall 10; such that when the movable wall 10 is actuated, fluid from the reservoir 50 flows into the space behind the piston and follows-up its movement.

Communication between the follow-up chamber 38 and the reservoir 50 must of course be prevented when the movable wall 10 is in its retracted position, in order that the input signal from the master cylinder 14 will be delivered to the output chamber 34 instead of to the reservoir 50 during power failure of the device. Communication of the reservoir 50 with the follow-up chamber 38 is controlled in the device shown in the drawing by means of an annular projection 52 on the back side of the movable wall 10; which annular projection 52 engages a suitable ring of sealing material 54 in the end wall of the hydraulic chamber to isolate the connection 56 from the remainder of the follow-up chamber 38 when the movable wall 10 is in its retracted position. A spring 58 is provided in the pressurizing chamber 34 to bias the piston 10 to its retracted position, and assure a suitable seal between the annular projection 52 and its seal 54. During power operation of the device, the push rod 12, of course moves the movable wall 10 out of engagement with the ring of sealing material 54 to thereafter permit fluid from the reservoir 50 to follow the movement of the movable wall 10.

Operation of the new and improved servo-motor above described will be readily apparent to those skilled in the art from the above description. Suffice it to say that power actuation of the servo-motor unit causes the push rod 12 to valve off the input signal of the master cylinder 14 from the follow-up chamber 38; while also closing off communication between opposite sides of the movable wall 10 to permit pressure to be generated in the output chamber 34 by the fluid pressure motor A. Thereafter, the input signal from the master cylinder 14 will of course not be permitted to "follow-up" the movement of the movable wall 10, such that the only displacement required thereafter from the master cylinder 14 will be that required to operate the control valve B. Immediately following the time that the push rod 12 closes off the passageway 44 and starts to move the movable wall 10, communication will be opened between the follow-up chamber 38 and the reservoir 50 such that none of the force generated by the fluid pressure motor A will be wasted in the creation of vacuum in the follow-up chamber behind the movable wall 10.

It will be seen that the above operations have been accomplished as a result of, or by means of, movement of the push rod 12, such that the desired valving operations are only accomplished during power actuation of the device. Although the embodiment shown in the drawing compensates for leakage in the discharge side of the fluid pressurizing device C by means of fluid obtained from the input signal system, and thence from the master cylinder 14, compensating fluid could be obtained from the reservoir 50 by means of suitable valving structure which is operated during power operation of the unit. While the valving operation is accomplished in the preferred embodiment shown in the drawing by means of movement of the fluid pressure motor's force transmitting member, the invention should not be considered as being limited thereto.

While the invention has been described in considerable detail, I do not wish to be limited to the particular constructions shown and described, and it is my intention to cover hereby all novel adaptations, modifications and arrangements thereof which come within the practice of those skilled in the art to which the invention relates.

I claim:

1. In a fluid pressurizing device for an automotive hydraulic braking system and the like adapted to be controlled by a primary pressurizing device, a power device, a power actuated movable element in said power device, a hydraulic cylinder, a movable wall in said hydraulic cylinder dividing said cylinder into a follow-up chamber adjacent said power device and an opposing pressure developing chamber on the opposite side of said movable wall, a force transmitting member operatively connected to said movable element for actuating said movable wall, a reservoir for hydraulic fluid, a hydraulically actuated control mechanism for controlling movement of said movable element, means biasing said control mechanism to a released position wherein said movable element and movable wall are urged to retracted positions, first conduit means conducting pressure fluid from said primary pressurizing device to said control mechanism, second conduit means conducting pressure fluid from said primary pressurizing device to said follow-up chamber, third conduit means communicating said follow-up chamber to said reservoir, first normally open valve means in said second conduit means constructed and arranged to close off said second conduit means when said movable element is actuated by said control mechanism, and second normally closed valve means in said third conduit means constructed and arranged to be opened when said movable element is actuated by said control mechanism.

2. In a fluid pressurizing device for an automotive hydraulic braking system and the like adapted to be controlled by a primary pressurizing device, a power device, a power actuated movable element in said power device, a hydraulic cylinder, a movable wall in said hydraulic cylinder dividing said cylinder into a follow-up chamber adjacent said power device and an opposing pressure developing chamber on the opposite side of said movable wall, a force transmitting member operatively connected to said movable element for actuating said movable wall, a reservoir for hydraulic fluid, a hydraulically actuated control mechanism for controlling movement of said movable element, means biasing said control mechanism to a released position wherein said movable element and movable wall are urged to retracted positions, first conduit means conducting pressure fluid from said primary pressurizing device to said control mechanism, second conduit means conducting pressure fluid from said primary pressurizing device to said follow-up chamber, third conduit means communicating said follow-up chamber to said reservoir, first normally open valve means in said second conduit means constructed and arranged to close off said second conduit means when said movable element is moved, and second normally closed valve means in said third conduit means constructed and arranged to be opened by movement of said movable element after said first normally open valve means is closed.

3. In a fluid pressurizing device for an automotive hydraulic braking system and the like adapted to be controlled by a primary pressurizing device, a power device, a power driven movable element in said power device, a hydraulic cylinder, a movable wall in said hydraulic cylinder dividing said cylinder into a follow-up chamber adjacent said power device and an opposing pressure developing chamber on the opposite side of said movable wall, a force transmitting member operatively connected to said movable element for actuating said movable wall, a reservoir for hydraulic fluid, a hydraulically actuated control mechanism for controlling movement of said movable element, means biasing said control mechanism to a released position wherein said movable element and movable wall are urged to retracted positions, first conduit means conducting pressure fluid from said primary pressurizing device to said control mechanism, second conduit means conducting pressure fluid from said primary pressurizing device to said follow-up chamber, third conduit means communicating said follow-up chamber to said reservoir, fourth conduit means for communicating said pressure developing chamber with one of said second and third conduit means when said movable wall is in its retracted position, first normally open valve means for said second conduit means constructed and arranged to close off said second conduit means when said movable element is actuated by said control mechanism, second normally closed valve means for said third conduit means constructed and arranged to be opened when said movable element is actuated by said control mechanism, and third valve means for said fourth conduit means for closing off said fourth conduit means when said movable wall is actuated by said movable element.

4. In a fluid pressure motor for an automotive hydraulic braking system and the like adapted to be controlled by a primary pressurizing device, a power cylinder, a movable wall in said power cylinder, a hydraulic cylinder, a piston in said hydraulic cylinder dividing said cylinder into a follow-up chamber adjacent said power cylinder and an opposing pressure developing chamber on the opposite side of said piston, a force transmitting member attached to said movable wall for actuating said piston, a reservoir for hydraulic fluid, a hydraulically actuated control valve for controlling movement of said movable wall, means biasing said control valve to a released position wherein said movable wall and piston are urged to retracted positions, first conduit means conducting pressure fluid from said primary pressurizing device to said control valve, second conduit means conducting pressure fluid from said primary pressurizing device to said follow-up chamber, third conduit means communicating said follow-up chamber to said reservoir, fourth conduit means for communicating said pressure developing chamber with said follow-up chamber when said piston is in its retracted position, first normally open valve means for said second conduit means constructed and arranged to close off said second conduit means when said force transmitting member is actuated by said movable wall, second normally closed valve means for said third conduit means constructed and arranged to be opened when said force transmitting member is actuated by said movable wall, and third valve means for said fourth conduit means for closing off said fourth conduit means when said force transmitting member is actuated by said movable wall.

5. In a fluid pressure motor for an automotive hydraulic braking system and the like adapted to be controlled by a primary pressurizing device, a power cylinder, a first movable wall in said power cylinder, a hydraulic cylinder, a piston in said hydraulic cylinder dividing said cylinder into a follow-up chamber adjacent said power cylinder and an opposing pressure developing chamber on the opposite side of said piston, a force transmitting member attached to said movable wall for actuating said piston, a reservoir for hydraulic fluid, a hydraulically actuated control valve for controlling movement of said movable wall, means biasing said control valve to a released position wherein said movable wall and piston are urged to retracted positions, first conduit means conducting pressure fluid from said primary pressurizing device to said control valve, second conduit means conducting pressure fluid from said primary pressurizing device to said follow-up chamber, third conduit means communicating said follow-up chamber to said reservoir, fourth conduit means communicating opposite sides of said piston, first normally open valve means for said second conduit means, and second normally closed valve means in said third conduit means, said force transmitting member being constructed and arranged to close said first valve means, open said second valve means, and close off said fourth conduit means when actuated by said movable wall.

References Cited in the file of this patent

UNITED STATES PATENTS

| | | |
|---|---|---|
| 2,631,433 | Thomas | Mar. 17, 1953 |
| 2,670,604 | Edge | Mar. 2, 1954 |